(12) United States Patent
Chen et al.

(10) Patent No.: US 11,156,821 B2
(45) Date of Patent: Oct. 26, 2021

(54) HIGH-ILLUMINATION NUMERICAL APERTURE-BASED LARGE FIELD-OF-VIEW HIGH-RESOLUTION MICROIMAGING DEVICE AND A METHOD FOR ITERATIVE RECONSTRUCTION

(71) Applicant: NANJING UNIVERSITY OF SCIENCE AND TECHNOLOGY, Jiangsu (CN)

(72) Inventors: Qian Chen, Nanjing (CN); Chao Zuo, Nanjing (CN); Jiasong Sun, Nanjing (CN); Shijie Feng, Nanjing (CN); Yuzhen Zhang, Nanjing (CN); Guohua Gu, Nanjing (CN)

(73) Assignee: NANJING UNIVERSITY OF SCIENCE AND TECHNOLOGY, Nanjing (CN)

( * ) Notice: Subject to any disclaimer, the term of this patent is extended or adjusted under 35 U.S.C. 154(b) by 143 days.

(21) Appl. No.: 16/496,676

(22) PCT Filed: Feb. 26, 2018

(86) PCT No.: PCT/CN2018/077181
§ 371 (c)(1),
(2) Date: Sep. 23, 2019

(87) PCT Pub. No.: WO2018/171381
PCT Pub. Date: Sep. 27, 2018

(65) Prior Publication Data
US 2021/0112187 A1 Apr. 15, 2021

(30) Foreign Application Priority Data
Mar. 24, 2017 (CN) .......................... 201710182458.7

(51) Int. Cl.
*G02B 21/06* (2006.01)
*G02B 21/02* (2006.01)
(Continued)

(52) U.S. Cl.
CPC ............. *G02B 21/06* (2013.01); *G02B 21/02* (2013.01); *G02B 21/08* (2013.01); *G02B 21/082* (2013.01);
(Continued)

(58) Field of Classification Search
None
See application file for complete search history.

(56) References Cited

U.S. PATENT DOCUMENTS

2011/0235875 A1* 9/2011 Filkins .................. G02B 21/16
382/128
2013/0278744 A1* 10/2013 Debarre ................. G02B 26/06
348/79
(Continued)

FOREIGN PATENT DOCUMENTS

CN 102881042 A 1/2013
CN 203490416 U 3/2014
(Continued)

OTHER PUBLICATIONS

EPO Machine Translation of CN105158888 (Year: 2021).*
(Continued)

*Primary Examiner* — David N Werner
(74) *Attorney, Agent, or Firm* — Birch, Stewart, Kolasch & Birch, LLP (57) ABSTRACT

A high-illumination numerical aperture-based large field-of-view high-resolution microimaging device, and a method for iterative reconstruction, the device comprising an LED array (1), a stage (2), a condenser (3), a microscopic objective (5), a tube lens (6), and a camera (7), the LED array (1) being
(Continued)

arranged on the forward focal plane of the condenser (3). Light emitted by the i-th lit LED unit (8) of the LED array (1) passes through the condenser (3) and converges to become parallel light illuminating a specimen (4) to be examined, which is placed on the stage (2); part of the diffracted light passing through the specimen (4) is collected by the microscopic objective (5), converged by the tube lens (6), and reaches the imaging plane of the camera (7), forming an intensity image recorded by the camera (1). The present device and method ensure controllable programming of the illumination direction, while also ensuring an illumination-numerical-aperture up to 1.20 and thus achieving a reconstruction resolution up to 0.15 μm.

16 Claims, 3 Drawing Sheets

(51) Int. Cl.
*G02B 21/08* (2006.01)
*G02B 21/33* (2006.01)
*G02B 21/36* (2006.01)
*H04N 5/235* (2006.01)
*H04N 5/361* (2011.01)
*H04N 9/47* (2006.01)

(52) U.S. Cl.
CPC ........... *G02B 21/086* (2013.01); *G02B 21/33* (2013.01); *G02B 21/367* (2013.01); *H04N 5/2352* (2013.01); *H04N 5/361* (2013.01); *H04N 9/47* (2013.01)

(56) References Cited

U.S. PATENT DOCUMENTS

2017/0205617 A1* 7/2017 Stoppe ................... G02B 27/58
2018/0231761 A1* 8/2018 Dai ..................... G02B 13/0095

FOREIGN PATENT DOCUMENTS

| CN | 104765138 A | 7/2015 |
|---|---|---|
| CN | 105158888 A | 12/2015 |
| CN | 105158893 A | 12/2015 |
| CN | 105158894 A | 12/2015 |
| CN | 106199941 A | 12/2016 |
| CN | 106204434 A | 12/2016 |
| CN | 106530381 A | 3/2017 |
| CN | 107065159 A | 8/2017 |
| CN | 107290846 A | 10/2017 |
| CN | 107966801 A | 4/2018 |

OTHER PUBLICATIONS

EPO Machine Translation of CN106204434 (Year: 2021).*
International Search Report issued in PCT/CN2018/077181 (PCT/ISA/210), dated Aug. 22, 2018.
Guo Bao-zeng et al; Design of LED Display Control System Based on FPGA; Chinese Journal of Liquid Crystals and Displays; vol. 25, No. 3; Jun. 2010; pp. 1-5.
Guoan Zheng et al; Wide-field, high-resolution Fourier ptychographic microscopy; Nature Photonics; published online Jul. 28, 2013; pp. 1-7.
J.M. Rodenburg; Advances in Imaging and Electron Physics, vol. 150; Ptychography and Related Diffractive Imaging Methods; pp. 87-184.
W. Hoppe; Trace Structure Analysis, Ptychography, Phase Tomography; Received Nov. 5, 1982; Ultramicroscopy 10 (1982), North-Holland Publishing Company; pp. 187-198.
Wang Ya-Li et al; Research on the key parameters of illuminating beam for imaging via ptychography in visible light band; Acta Phys. Sin. vol. 62, No. 6 (2013) 064206; pp. 1-10.

* cited by examiner

HIGH-ILLUMINATION NUMERICAL APERTURE-BASED LARGE FIELD-OF-VIEW HIGH-RESOLUTION MICROIMAGING DEVICE AND A METHOD FOR ITERATIVE RECONSTRUCTION

FIELD OF THE INVENTION

The invention belongs to optical microscopic imaging technique, in particular a high-illumination numerical aperture-based large field-of-view high-resolution microimaging device, and a method for iterative reconstruction.

BACKGROUND OF THE INVENTION

In the field of microscopic imaging, higher resolution has always been the goal, but there is a key issue in improving resolution, that is, the space bandwidth product of a microscope is not improved with the resolution increasing. From the perspective of the imaging system, in order to achieve high resolution, the numerical aperture of a microscopic objective must be increased, but the increasing in spatial resolution and the expansion of the field-of-view are often contradictory that is difficult to reconcile. In short, the full view of a measured object can be seen using low-magnification objective, but when switched to a high-magnification objective only a small region of the measured object can be seen. At present, in order to overcome the contradiction that the resolution and the field-of-view are difficult to be achieved simultaneously, it is common to combine a conventional microscopic system with high-precision mechanical scanning system and post-processing later-spatial image stitching method to merge a plurality of small field-of-view high-resolution images into a large field-of-view high-resolution image (Sun Xiwei, Wang Zhen, Li Pan, Li Jianxun, Wang Wenhe. The device which is applicable for anti-acid stained image stitching of *Mycobacterium tuberculosis*: China, 2013205777012 [P].2013 Sep. 17.). However, due to the introduction of mechanical moving device, the stability and imaging speed during the measurement become another contradiction that is difficult to reconcile, and increasing the scanning speed will inevitably affect the imaging stability. Therefore, in order to overcome the contradiction between resolution and field-of-view without using a mechanical moving device, it is necessary to adopt the method of computational imaging proposed in recent years, such as the synthetic aperture based imaging method.

The synthetic-aperture based scanning imaging method was first proposed by Hoppe for studying crystal structure (Hoppe W. Trace structure analysis, ptychography, phase tomography [J]. Ultramicroscopy, 1982, 10(3): 187-198.), and the effectiveness of the method is verified by the research of the scanning transmission electron diffraction microscopic imaging of the crystal and the amorphous. Rodenburg and Faulknerand improved this method many times by combining the phase retrieval algorithm (Rodenburg J M. Ptychography and related diffractive imaging methods [J]. Advances in Imaging and Electron Physics, 2008, 150: 87-184.). At present, the imaging method has been experimentally accomplished in different wavelengths such as visible light, X-ray and electron microscope, and several techniques have been developed to improve its imaging quality and resolution. This technique shows huge potential in wide-field imaging and high-resolution imaging. The above mentioned conventional synthetic aperture imaging technique is realized by moving a full-transparent small hole (or the specimen to be examined itself) to make the incident plane waves illuminate different regions of the specimen to be examined, namely, the size, geometry and position of illumination beams are controlled by the small hole, and a series of diffraction intensity patterns are thus obtained, which can be used to reconstruct the amplitude and phase information of the specimen to be examined (Wang Yali, Shi Yushi, Li Tuo, et al. Research on key parameters of illumination beam for imaging via ptychography in visible light band[J]. Acta Physica *Sinica,* 2013, Vol. 62, No. 6.064206-1-9). The key to synthetic aperture imaging technique is each time a "sub-aperture", a portion of the specimen to be examined, is illuminated, it must be overlapped with one other "sub-aperture" at least. In this way, a reconstruction algorithm was established. When reconstructing the complex amplitude of each "sub-aperture" separately, the constraints of other "sub-aperture" diffraction distributions also must be satisfied, so that the final entire complex amplitude information of the specimen to be tested is the common solution of all the "sub-apertures", so that a large field-of-view high-resolution image of a specimen to be examined is synthesized by stitching and combining each sub-aperture. Synthetic aperture imaging is a robust and simple microscopic imaging technique, but it has always lacked a robust image reconstruction algorithm. Especially when the acquired image has low signal-to-noise ratio, it is often difficult to obtain an ideal reconstructed image. Therefore, how to improve the reconstruction quality and signal-to-noise ratio has become a technical problem that synthetic aperture imaging technique must overcome. In 2013, Guoan Zheng introduced synthetic aperture imaging from spatial domain into frequency domain, and proposed Fourier ptychographic microscopy technique, also known as frequency domain ptychographic imaging technology (Zheng G, Horstmeyer R, Yang C. Wide-field, high-resolution Fourier ptychographic microscopy [J]. Nature photonics, 2013, 7(9): 739-745.). Although this method can achieve high-resolution large field-of-view microscopic imaging and greatly improve the spatial bandwidth product compared with the traditional optical microscopy technology, because the condenser is discarded in its imaging system, the numerical aperture of the illumination is hard to exceed 0.7, which results in a typical reconstruction resolution less than 300 nm. In addition, since the image reconstruction quality is affected by various system errors in the system, how to achieve a synthetic numerical aperture of 1.6 and a high-precision large field-of-view high-resolution microscopic imaging with a reconstructed resolution of 150 nm without sacrificing the field-of-view has become a technical problem that must be overcome by Fourier ptychographic imaging technique.

SUMMARY OF THE INVENTION

The purpose of the present invention is to provide a high-illumination numerical aperture-based large field-of-view high-resolution microimaging device and a method for iterative reconstruction, which realizes a synthetic numerical aperture of 1.6 and a high-precision large field-of-view high-resolution microscopic imaging with a reconstructed resolution of 150 nm without sacrificing the field-of-view and greatly improves the imaging quality and the reconstruction resolution of Fourier ptychographic imaging technique.

The technical solution for achieving the purpose of the present invention is: A high-illumination numerical aperture-based large field-of-view high-resolution microimaging device, and a method for iterative reconstruction, the device comprising an LED array, a stage, a condenser, a microscopic objective, a tube lens, and a camera, the LED array being arranged on the forward focal plane of the condenser, and the center of the LED array is on the optical axis of the microscope objective; The back focal plane of the microscope objective coincides with the forward focal plane of the tube lens, and the imaging plane of the camera is placed on the back focal plane of the tube lens, and during imaging, a specimen to be examined on the stage is adjusted to the front focal plane position of the microscope objective to form an infinity-corrected imaging system;

Light emitted by the i-th lit LED unit of the LED array passes through the condenser and converges to become parallel light illuminating a specimen to be examined, which is placed on the stage; part of the diffracted light passing through the specimen is collected by the microscopic objective, converged by the tube lens, and reaches the imaging plane of the camera, forming an intensity image recorded by the camera. The steps of a high-illumination numerical aperture-based large field-of-view high-resolution microimaging iterative reconstruction method are characterized as follows:

step one, the brightness of the LED unit is calibrated, using the LED array as an illumination source of a high illumination-numerical-aperture based large field-of-view high-resolution microscopic imaging device, sequentially lighting up each LED unit of the LED array, and after illuminating the blank specimen, using the high magnification objective lens to collect the corresponding images and calculating the normalized brightness correction coefficient corresponding to each LED unit in the three channels of red, green and blue;

step two, the position of the LED array is calibrated, using the resolution board as the specimen to be examined, using the LED array as the illumination source of a high illumination-numerical-aperture based large field-of-view high-resolution microscopic imaging device, sequentially lighting up each LED unit of the LED array, after illuminating the specimen to be examined, images in focus and images with defocus distance h are respectively collected, and then the illumination angle corresponding to each of the three channels of red, green and blue for each LED unit is calculated by using a sub-pixel registration algorithm, then determining the position of the LED array by using nonlinear regression.

step three, raw images are captured, using the LED array as an illumination source of a high illumination-numerical-aperture based large field-of-view high-resolution microscopic imaging device, sequentially lighting up each LED unit of the LED array, after illuminating the specimen to be examined, the corresponding low-resolution raw images are collected;

step four, raw images are pre-processed, including threshold denoising and brightness correction, firstly using the average value of the dark current noise of the camera as a threshold, performing threshold denoising on the captured low-resolution raw images, obtaining denoised low-resolution images, and then dividing each denoised low-resolution image by the normalized brightness correction coefficient obtained in step one, brightness-corrected low-resolution images are obtained;

step five, high-resolution images are initialized, adding and averaging all the low-resolution bright-field images among the brightness-corrected low-resolution images, and then initializing the amplitude and phase of high-resolution images by up-sampling;

step six, iterative reconstruction, all the brightness corrected low-resolution images are subjected to synthetic aperture calculation one by one in the frequency domain using the pixel binning based Fourier ptychographic iterative reconstruction method and gradually reducing the updating coefficient; The cost function value is used as a criterion, and when the cost function value is less than a given threshold, the iteration is stopped, and at this moment, the amplitude and phase of the high-resolution image are the final reconstructed large field-of-view high-resolution microscopic image. The above-mentioned high illumination numerical aperture-based large field-of-view high-resolution microimaging iterative reconstruction method is only suitable for reconstructing monochrome images and if true color images need to be reconstructed, each LED unit illuminates the object with red light, green light and blue light respectively, and then image reconstruction is performed separately for each illumination wavelength. The reconstructed three sets of images are synthesized as the red, green and blue components of the final true color image respectively.

Compared with the prior arts, the invention has the remarkable advantages: (1) the LED array is adopted as the illumination light source, and the condenser is retained, so that the programming controllability of illumination direction is guaranteed, meanwhile the illumination numerical aperture can reach up to 1.20, thus obtaining the reconstruction resolution up to 0.15 um. (2) Without pre-calibrating the errors of each parameter of the device, the captured original images are properly preprocessed, a large field-of-view high-resolution image can be reconstructed very stably and accurately. (3) Under the low-magnification objective lens, a pixel binning based Fourier ptychographic iteration algorithm are utilized to realize the super-large field-of-view high-resolution micro imaging and effectively improve the robustness of the noise.

The invention is further described in detail below with reference to the accompanying drawings.

BRIEF DESCRIPTION OF THE DRAWINGS

FIG. 4 (*a*) is a low-resolution image taken by a 10× objective lens (0.4 numerical aperture) while simultaneously lighting up all bright field LED units in the LED array to illuminate the specimen of the 1951 USAF resolution test board; The images in the square frame of FIG. 4 are selected to be directly zoom in to obtain FIG. 4 (*b*1), FIG. 4 (b2) and FIG. 4 (*b*3), wherein FIG. 4 (*b*1), FIG. 4 (*b*2) and FIG. 4 (*b*3) are the image captured in three channels of red, green and blue respectively and then selecting smaller areas to be directly amplified, and FIG. 4 (*c*1), FIG. 4 (*c*2), FIG. 4 (C 3) are obtained, wherein FIG. 4 (*c*1), FIG. 4 (*c*2) and FIG. 4 (C3) are the images of three channels of red, green and blue respectively. The region in FIG. 4(c) is selected for iterative reconstruction, and the obtained high-resolution results are shown in FIG. 4 (d1), FIG. 4 (d2), and FIG. 4 (d3), wherein FIG. 4 (d1) and FIG. 4 (d2) and FIG. 4(d3) are images reconstructed in three bands of red, green, and blue respectively.

DESCRIPTION OF THE PREFERRED EMBODIMENT

Figure 1:
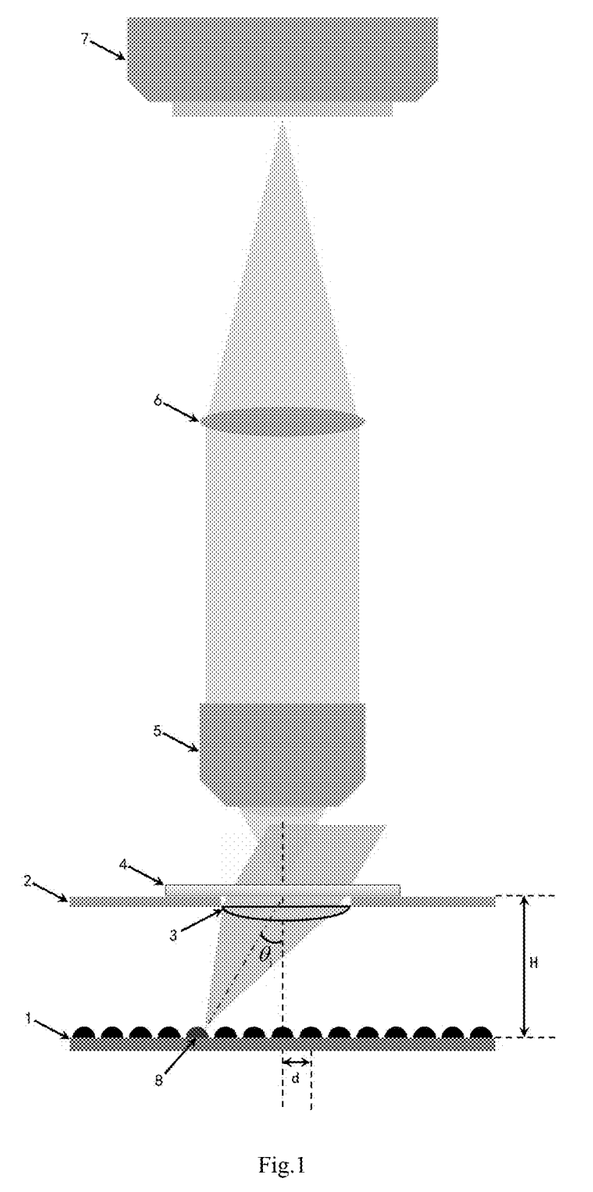
FIG. 1 is the schematic diagram of a microscope optical path based on a programmable LED array.

Referring to FIG. 1, the actual hardware platform utilized by the high-illumination numerical aperture-based large field-of-view high-resolution microimaging device, and the method for iterative reconstruction is an LED array-based microscope. The invention of a high-illumination numerical aperture-based large field-of-view high-resolution microimaging device solves the technical problem of using a condenser to increase the resolution to 150 nm without sacrificing the imaging field-of-view, the device comprising an LED array (1), a stage (2), a condenser (3), a microscopic objective (5), a tube lens (6), and a camera (7), the LED array (1) being arranged on the forward focal plane of the condenser (3), and the center of the LED array (1) is on the optical axis of the microscope objective (5); The back focal plane of the microscope objective (5) coincides with the forward focal plane of the tube lens (6), and the imaging plane of the camera (7) is placed on the back focal plane of the tube lens (6), and during imaging, a specimen (4) to be examined on the stage (2) is adjusted to the front focal plane position of the microscope objective (5) to form an infinity-corrected imaging system.

The LED array (1) includes a plurality of (at least 261) LED units (8) which are equally spaced to form a two-dimensional array. Each of the LED units is a three-color unit with the colors of red, green and blue and its typical wavelength is red light 633 nm, green light 525 nm and blue light 465 nm. The center-to-center spacing d between each LED unit is typically 1-4 mm. The LED array (1) does not need to be processed separately and is generally commercially available for purchase. Table 1 shows the product parameters of a commercially available LED array. In this LED array, the LED unit has 32 rows and 32 columns, 1024 in total, and the brightness of each LED unit is above 2000 cd/m².

Light emitted by the i-th lit LED unit (8) of the LED array (1) passes through the condenser (3) and converges to become parallel light illuminating a specimen (4) to be examined, which is placed on the stage (2); part of the diffracted light passing through the specimen (4) is collected by the microscopic objective (5), converged by the tube lens (6), and reaches the imaging plane of the camera (7), forming an intensity image recorded by the camera (7). Each LED unit in LED array (1) can be individually lighted up, and the specific method of lighting up LED units is a prior art, and the implementation circuit can be achieved by adopting (but is not limited to) a prior art such as microcontrollers, an ARM, or a programmable logic device and the like; for the specific implementation methods, the relevant references (Guo Baozeng, Deng Yumiao: FPGA-based LED display control system design [J]. LCD and Display, 2010, 25(3): 424-428) can be referred to.

TABLE 1

Physical parameters of the LED array

| items | parameters |
|---|---|
| wavelength of LED unit | red 633 nm, green 525 nm, blue 475 nm |
| number of LED units | 32 × 32 |
| spacing of LED units | 1.67 mm |
| light emitting surface size of LED units | 150 μm |
| brightness of LED units | 2000 cd/m² |
| array dimensions | 55 mm × 55 mm × 17 mm |
| weight | 170 g |
| cone angle of LED unit | 150° |
| power | 5 v |
| current | the maximum 2A (all light up) |

In order to meet the minimum frequency domain sampling rate needed by the reconstruction method of the present invention, the microscope objective (5) has a numerical aperture of $NA_{obj}$ and satisfies $$NA_{obj}\frac{f}{d} > 1,$$

wherein f is the focal length of the condenser (3), d is the spacing between adjacent LED units (8). In order to ensure the quality and accuracy of the reconstructed image, it is necessary to ensure that d is smaller than 2 mm, that is, an LED array with LED unit distance of less than 2 mm must be used. At the same time, in order to meet the minimum spatial sampling rate required by the reconstruction algorithm, the illumination wavelength of the LED array (1) is λ, the magnification of microscopic objective (5) is Mag, the size of pixel is $\Delta x_{cam}$, which satisfies $$\lambda \frac{Mag}{2\Delta x_{cam}} \frac{f}{d} > 1.$$

The camera (7) is a color or monochrome camera, and if it is a monochrome camera, when imaging, each LED unit (8) of the LED array (1) emits red or green or blue monochromatic light respectively, recording all monochrome images sequentially by the monochrome camera; if it is a color camera, when imaging, each of the LED units (8) of the LED array (1) simultaneously emits red, green and blue light, recording all color images by the color camera.

In the invention, microscopic oil can be added between the condenser (3) and the specimen (4) to be examined for obtaining a higher illumination numerical aperture. Generally, if no microscopic oil is added between the condenser (3) and the specimen (4) to be examined, the illumination numerical aperture is up to 0.95. After the addition of microscopic oil, the illumination numerical aperture can reach to more than 1.20.

Figure 3:
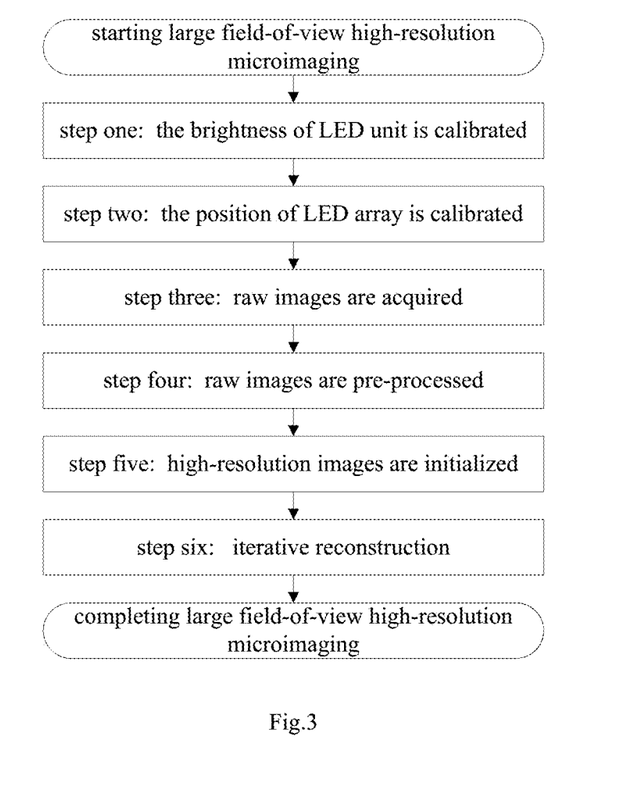
FIG. 3 is the schematic diagram of a reconstruction process of the high numerical aperture-based large field-of-view high-resolution iterative reconstruction of the present invention.

Referring to FIG. 3, the present invention utilizes the above-described device for a high—illumination numerical aperture—based large field-of-view high-resolution micrmaging iterative reconstruction method and the steps are as follows:

step one, the brightness of the LED unit (8) is calibrated, using the LED array (1) as an illumination source of a high-illumination numerical aperture-based large field-of-view high-resolution microimaging device, sequentially lighting up each LED unit (8) of the LED array (1), and after illuminating the blank specimen (4), using the high magnification objective lens to collect the corresponding image and calculating the normalized brightness correction coefficient corresponding to each LED unit (8) in the three channels of red, green and blue.

Figure 2:
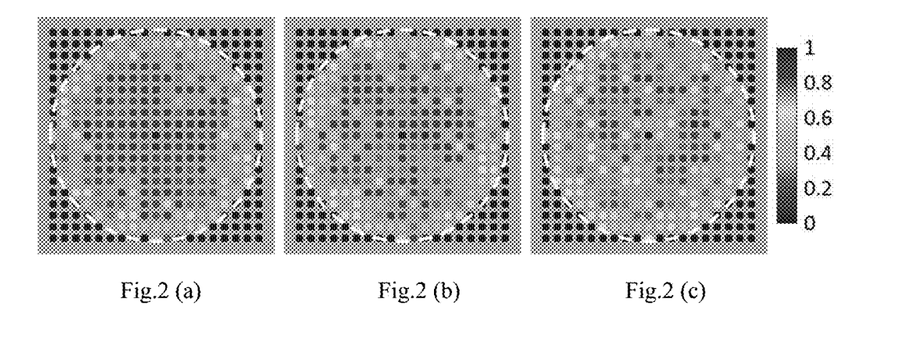
FIG. 2 is the normalized brightness of each LED unit in the LED array, including FIG. 2(*a*), FIG. 2(*b*), and FIG. 2(*c*), wherein FIG. 2(*a*), FIG. 2(*b*), and FIG. 2(*c*) are normalized brightness corresponding to three channels of red, green and blue respectively.

In step one, the LED array (1) serves as an illumination source of the microscope, sequentially lights up each of the LED units (8) in the LED array (1), and after illuminating the blank specimen (4), a high-magnification objective lens (a typical 40× microscopic objective with 0.95 numerical aperture) is used for collecting the corresponding images, the entire LED array (1) comprises a total of N LED units, N>261, each LED unit (8) emits monochromatic light of three colors of red, green and blue, respectively, and a total of 3N low-resolution images are captured, and the image of the blank specimen lighted by the i-th LED unit with color c is captured and marked as $I_{i,c}^{kb}(r)$, where i=1, 2, ..., N, c=r, g, b, r is two-dimensional coordinates of real space r=(x,y), and then the average intensity of each image is calculated $$B_{i,c}^{kb} = \frac{1}{N_{pixel}} \sum_r I_{i,c}^{kb}(r)$$

and becomes the average brightness of each LED unit in three channels of red, green and blue, where $N_{pixel}$ is the total number of pixels in one image $I_{i,c}^{kb}(r)$, and the average brightness corresponding to the LED unit (8) in the center of the LED array (1) is $B_{l,c}^{kb}$, then the normalized brightness correction coefficient R of each LED unit corresponding to three channels of red, green and blue is $R_{i,c}^{bri} = B_{i,c}^{kb}/B_{l,c}^{kb}$.

Step two, the position of the LED array (1) is calibrated, using the resolution board as the specimen (4) to be examined, using the LED array (1) as the illumination source of a high illumination-numerical-aperture based large field-of-view high-resolution microscopic imaging device, sequentially lighting up each LED unit (8) of the LED array (1), after illuminating the specimen (4) to be examined, images in focus and images with defocus distance h are respectively collected, and then the illumination angle corresponding to each of the three channels of red, green and blue for each LED unit (8) is calculated by using a sub-pixel registration algorithm, then determining the position of the LED array by using nonlinear regression.

In step two, using the resolution board as the specimen (4) to be examined, using the LED array (1) as the illumination source, sequentially lighting up each LED unit (8). First, after the LED array (1) illuminating the specimen (4) to be examined, in-focus image $I_{i,c}^{focus}$ and defocus image $I_{i,c}^{defocus}$ with defocus distance h (typical value of h ranges from 10 microns to 30 microns) are respectively collected; according to angular spectrum diffraction theory, numerically propagating in-focus image $I_{l,c}^{focus}$ corresponding to LED unit (8) in the center of LED array (1) along optical axis with h distance, thereby obtaining numerical defocus image $I_{l,c}^{pro}$;

and then calculating the offset value $(PY_x, PY_y)$ of each defocus image $I_{i,c}^{defocus}$ relative to the numerical defocus image $I_{l,c}^{pro}$ by using sub-pixel registration algorithm, the spatial frequency vector of the illumination light corresponding to the i-th LED unit is $$u_i = (u_x, u_y) = \frac{2\pi}{\lambda} \left( \frac{PY_x}{\sqrt{PY_x^2 + PY_y^2 + h^2}}, \frac{PY_y}{\sqrt{PY_x^2 + PY_y^2 + h^2}} \right)$$

where $(u_x, u_y)$ is the spatial frequency along the x,y direction, and λ is the wavelength of the illumination light; finally, the position of the LED array is determined by nonlinear regression, the formulas are:

$$Q(u_i, \theta^0, \Delta x^0, \Delta y^0, f^0) = \sum_i |u_i - u_i^0|^2$$

$$(\theta, \Delta x, \Delta y, f) = \mathcal{NL}[Q(u_i, \theta^0, \Delta x^0, \Delta y^0, f^0)]$$

$$x_i = d[\cos(\theta)m_i + \sin(\theta)n_i] + \Delta x$$

$$y_i = d[-\sin(\theta)m_i + \cos(\theta)n_i] + \Delta y$$

$$u_i = \frac{2\pi}{\lambda} \frac{x_i}{f}$$

$$v_i = \frac{2\pi}{\lambda} \frac{y_i}{f}$$

where Q( ... ) is the objective function of the nonlinear regression method, (θ, Δx, Δy, f) are the updated four position parameters of the LED array, which are respectively the rotation error, the translation error in the x direction, the translation error in the γ direction, and the focusing error, $(\theta^0, \Delta x^0, \Delta y^0, f^0)$ are the initialized LED array position parameters, $\mathcal{NL}[ ... ]$ indicates that the nonlinear regression operation is performed, and d is the spacing between two adjacent LED units (8) of the LED array (1), $(x_i, y_i)$ represents the spatial position coordinates of the i-th LED unit, λ is the wavelength of the illumination light, and $(m_i, n_i)$ is the row number and the column number corresponding to the i-th LED unit.

Step three, raw images are acquired, using the LED array (1) as an illumination source of a high-illumination numerical aperture-based large field-of-view high-resolution micro-imaging device, sequentially illuminating each LED unit (8) of the LED array (1), after irradiating the specimen (4) to be examined, the corresponding low-resolution raw images are collected.

Step four, raw images are pre-processed, including threshold denoising and brightness correction, firstly using the average value of the dark current noise of the camera (7) as a threshold, performing threshold denoising on the captured low-resolution raw images, obtaining denoised low-resolution images (including low-resolution bright field images and low-resolution dark field images), and then dividing each denoised low-resolution image by the normalized brightness correction coefficient obtained in step one, brightness-corrected low-resolution images are obtained;

In step four: first, sequentially lighting up the LED units and illuminating a specimen (4) to be examined by using the monochromatic light of red, green and blue, then the captured original low-resolution images are marked as $I_{i,c}$; turning off all the LED units and the captured dark current noise image $I_{dark}$; the average value of the dark current noise of the camera is used as a threshold, then performing threshold denoising on the captured original low-resolution images, the formula is $$I_{i,c}^{dn}(r) = \begin{cases} I_{i,c}(r) - \text{mean}(I_{dark}), & I_{i,c}(r) > \text{mean}(I_{dark}) \\ 0, & I_{i,c}(r) <= \text{mean}(I_{dark}) \end{cases}$$

where $I_{i,c}^{dn}$ represents the low-resolution images after the threshold denoising, mean ( . . . ) indicates evaluating average gray value of the image; then dividing each image by the normalized brightness correction coefficient obtained in step one to accomplish the image brightness correction process, wherein the formula is:

$$I_{i,c}^{uni} = I_{i,c}^{dn}/R_{i,c}^{bri}$$

where $I_{i,c}^{uni}$ is the low-resolution image after brightness correction, $I_{i,c}^{dn}$ is the low-resolution image after performing threshold denoising, $R_{i,c}^{bri}$ is the normalized brightness correction coefficient obtained in step one.

Step five, high-resolution images are initialized, adding and averaging all the low-resolution bright-field images among the brightness-corrected low-resolution images, and then initializing the amplitude and phase of high-resolution images by up-sampling. The formula for high-resolution image initialization is:

$$o_0^{ini} = \sqrt{UP\left[\frac{1}{N_b}\sum_{i=1}^{N_b} I_{i,c}^{ini}\right]}$$

where $o_0^{ini}$ is the initialized high-resolution complex amplitude image, UP[ . . . ] indicates the up-sampling nearest-neighbor interpolation and $N_b$ is the total number of bright-field images.

Step six: iterative reconstruction, all the brightness corrected low-resolution images are subjected to synthetic aperture calculation one by one in the frequency domain using the pixel binning based Fourier ptychographic iterative reconstruction method and gradually reducing the updating coefficient; The cost function value is used as a criterion, and when the cost function value is less than a given threshold (the typical value of the threshold can be set as 0.01 and can also be adjusted empirically), the iteration is stopped, and at this moment, the amplitude and phase of the high-resolution image are the final reconstructed large field-of-view high-resolution microscopic image.

In step six: the formula based on the pixel binning based Fourier ptychographic iterative method is as follows:

$$O_i^k = F\{o_i^k\}$$

$$\Psi_i^k = F\left\{UP\left[\sqrt{\frac{I_{i,c}^{uni}}{DOWN[|F^{-1}\{P_i^k O_i^k\}|^2]}}\right]F^{-1}\{P_i^k O_i^k\}\right\}$$

$$O_{i+1}^k = O_i^k - \alpha^k \frac{|P_i^k|}{|P_i^k|_{max}(|P_i^k|^2+\gamma)}P_i^{k*}(\Psi_i^k - P_i^k O_i^k)$$

$$P_{i+1}^k = P_i^k - \beta^k \frac{|O_i^k|}{|O_i^k|_{max}(|O_i^k|^2+\gamma)}O_i^{k*}(\Psi_i^k - P_i^k O_i^k)$$

$$\alpha^k = \frac{\alpha^1}{k}, \alpha^1 = \frac{1}{2}$$

$$\beta^k = \frac{\beta^1}{k}, \beta^1 = \frac{1}{N}$$

$$COST^k = \sum_i abs(I_{i,c}^{uni} - DOWN[|F^{-1}\{P_i^k O_i^k\}|^2])$$

where F{ . . . } indicates that the Fourier transform is performed, $F^{-1}${ . . . } indicates that the inverse Fourier transform is performed, UP[ . . . ] indicates that the up-sampling nearest-neighbor interpolation is performed, DOWN[ . . . ] indicates the down-sampling pixel binning process; $O_i^k$ the high-resolution spectrum of the specimen to be examined, k represents the k-th iteration, $P_i^k$ is the spectrum aperture function of the microscopic objective, and $\Psi_i^k$ is the updated local spectrum of the specimen to be examined, $\gamma$ is a constant to ensure that the denominator is not zero, the typical value is 0.001; | . . . | represents the modulus of the two-dimensional complex matrix, $| ... |_{max}$ represents the maximum value in the modulus of the two-dimensional complex matrix; $\alpha^k$ is the updated coefficient of the spectrum of the specimen to be examined in the k-th iteration, $\beta^k$ is the updated coefficient of the aperture function of the microscopic objective in the k-th iteration, $COST^k$ is the cost function. When the cost function $COST^k$ is less than a certain fixed threshold $\epsilon$ (the typical value of $\epsilon$ is 0.001) at the end of the k-th iteration, the iteration is considered to be convergent and the iteration is stopped, the amplitude and the phase of the high-resolution image at the moment are the finally reconstructed large field-of-view high-resolution microscopic image.

The above reconstruction process is only applicable to reconstructing a monochrome image, and the present invention utilizes a high-illumination numerical aperture-based large field-of-view high-resolution microimaging iterative reconstruction method of the above device, the steps of reconstructing a true color image are as follows:

step one, the brightness of the LED unit (8) is calibrated, using the LED array (1) as an illumination source of a high illumination-numerical-aperture based large field-of-view high-resolution microscopic imaging device, sequentially lighting up each LED unit (8) of the LED array (1), and after illuminating the blank specimen (4), using the high magnification objective lens to collect the corresponding image and calculating the normalized brightness correction coefficient corresponding to each LED unit (8) in the three channels of red, green and blue;

step two, the position of the LED array (1) is calibrated, using the resolution board as the specimen (4) to be examined, using the LED array (1) as the illumination source of a high illumination-numerical-aperture based large field-of-view high-resolution microscopic imaging device, sequentially lighting up each LED unit (8) of the LED array (1), after illuminating the specimen (4) to be examined, in-focus images and defocus images with defocus distance h are respectively collected, and then the illumination angle corresponding to each of the three channels of red, green and blue for each LED unit (8) is calculated by using a sub-pixel registration algorithm, then determining the position of the LED array by using nonlinear regression;

step three, raw images are captured, using the LED array (1) as an illumination source of a high illumination-numerical-aperture based large field-of-view high-resolution microscopic imaging device, sequentially lighting up each LED unit (8) of the LED array (1), after illuminating the specimen (4) to be examined, the corresponding low-resolution raw images are collected;

step four: raw images are pre-processed, including threshold denoising and brightness correction, firstly using the average value of the dark current noise of the camera (7) as a threshold, performing threshold denoising on the captured low-resolution raw images to obtain denoised low-resolution images, and then dividing each denoised low-resolution image by the normalized brightness correction coefficient obtained in step one, then brightness-corrected low-resolution images are obtained;

step five, high-resolution images are initialized, adding and averaging all the low-resolution bright-field images among the brightness-corrected low-resolution images, and then initializing the amplitude and phase of the high-resolution images by up-sampling;

step six, iterative reconstruction; each of the brightness corrected low-resolution images is subjected to synthetic aperture calculation one by one in the frequency domain by using pixel binning based Fourier ptychographic recovery method and the updating coefficient is gradually reduced; the cost function value is used as a criterion, and when the cost function value is less than a given threshold, the iteration is stopped. and at this moment, the amplitude and phase of the high-resolution images are the final reconstructed large field-of-view high-resolution microscopic images; step seven, color fusion; repeating step five and step six, and respectively reconstructing high-resolution images of red, green and blue channels, then three reconstructed high-resolution images are synthesized as the red, green and blue channels respectively of the final true color image.

Figure 4:
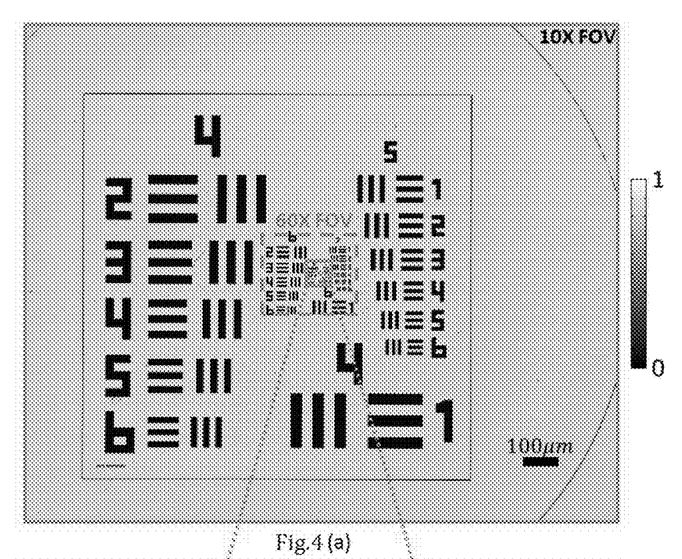

In order to test the iterative reconstruction method of large field-of-view high-resolution microimaging, the present invention selects the 1951 USAF resolution test board for imaging test. In the experiment, the used LED array comprises 261 LED units, and these 261 LED units are used to generate 261 illumination light with different angles. The distance between LED units is 1.67 mm, the center wavelength of the emitted red light is 632.8 nm, and the spectral bandwidth is about 20 nm. The microscope objective used in the system has a numerical aperture of 0.4 and a magnification of 10×. At the same time, the low-resolution image captured when simultaneously lighting up all brightfield LED units in the LED array to illuminate the 1951 USAF resolution test board specimen is shown in FIG. 4(*a*). The images in the square frame of FIG. 4 are selected to be directly zoom in to obtain FIG. 4 (*b*1), FIG. 4 (b2) and FIG. 4 (*b*3), wherein FIG. 4 (*b*1), FIG. 4 (*b*2) and FIG. 4 (*b*3) are respectively the images captured in three channels of red, green and blue, then selecting a smaller area to directly amplify, and FIG. 4 (*c*1), FIG. 4 (*c*2), FIG. 4 (C3) are obtained, wherein FIG. 4 (*c*1), FIG. 4 (*c*2) and FIG. 4 (C3) are respectively the images of three channels of red, green and blue. As shown in the figures, the minimum distinguishable feature is the fifth elements in the ninth group, and according to the physical parameters of the 1951 USAF resolution test board (see Table 2), the original imaging resolution of the imaging system is about 0.62 um. This is in good agreement with the results of the Rayleigh diffraction limit formula of the imaging system. The high-resolution image reconstructed by the method of the present invention is shown in FIG. 4(*d*), wherein FIG. 4(*d*1), FIG. 4(*d*2), and FIG. 4(*d*3) are respectively reconstructed images of three channels of red, green and blue. As shown in the figure, the smallest distinguishable feature in the resolution board is the fifth elements in the eleventh group. As can be seen from Table 2, the synthesized resolution of the imaging system is superior to 0.154 um. Comparing FIG. 4(*d*) and FIG. 4(*c*), it can be clearly seen that the method of the invention can realize large field-of-view high-resolution imaging using low numerical aperture objective and the reconstructed image has a good signal to noise ratio.

TABLE 2

Physical parameters of the 1951 USAF resolution test board

| | group id lp/mm | | | | | | | | | | | | | |
|---|---|---|---|---|---|---|---|---|---|---|---|---|---|---|
| Elements | −2 | −1 | 0 | 1 | 2 | 3 | 4 | 5 | 6 | 7 | 8 | 9 | 10 | 11 |
| 1 | 0.250 | 0.500 | 1.00 | 2.00 | 4.00 | 8.00 | 16.0 | 32.0 | 64.0 | 128 | 256 | 512 | 1024 | 2048 |
| 2 | 0.280 | 0.561 | 1.12 | 2.24 | 4.49 | 8.98 | 18.0 | 36.0 | 71.8 | 144 | 287 | 575 | 1149 | 2299 |
| 3 | 0.315 | 0.630 | 1.26 | 2.52 | 5.04 | 10.1 | 20.2 | 40.3 | 80.6 | 261 | 323 | 645 | 1290 | 2580 |
| 4 | 0.353 | 0.707 | 1.41 | 2.83 | 5.66 | 11.3 | 22.6 | 45.3 | 90.5 | 181 | 362 | 724 | 1448 | 2896 |
| 5 | 0.397 | 0.793 | 1.59 | 3.17 | 6.35 | 12.7 | 25.4 | 50.8 | 102 | 203 | 406 | 813 | 1625 | 3251 |
| 6 | 0.445 | 0.891 | 1.78 | 3.56 | 7.13 | 14.3 | 28.5 | 57.0 | 114 | 228 | 456 | 912 | 1825 | 3649 |

The invention claimed is:

1. A high-illumination numerical aperture-based large field-of-view high-resolution micro-imaging iterative reconstruction method, by using a high-illumination numerical aperture-based large field-of-view high-resolution microimaging device comprising:
an LED array;
a stage;
a condenser;
a microscopic objective;
a tube lens; and
a camera,
wherein the LED array is arranged on a forward focal plane of the condenser, and a center of the LED array is on an optical axis of the microscope objective,
wherein a back focal plane of the microscope objective coincides with a forward focal plane of the tube lens, an imaging plane of the camera is placed on a back focal plane of the tube lens, and during imaging, a specimen to be examined on the stage is adjusted to a front focal plane position of the microscope objective to form an infinity-corrected imaging system, and
wherein light emitted by an i-th lit LED unit of the LED array passes through the condenser and converges to become parallel light illuminating the specimen to be examined, which is placed on the stage, and part of diffracted light passing through the specimen is collected by the microscopic objective, converged by the tube lens, and reaches the imaging plane of the camera, forming an intensity image recorded by the camera,
said method comprising the steps of:
calibrating a brightness of the LED unit, by using the LED array as an illumination source of the high-illumination numerical aperture-based large field-of-view high-resolution microimaging device, sequentially lighting up each LED unit of the LED array, and after illuminating a blank specimen, using high magnification objective lens to collect corresponding images and calculating a normalized brightness correction coefficient corresponding to each LED unit in three channels of red, green and blue;

calibrating a position of the LED array, by using a resolution board as the specimen to be examined, using the LED array as the illumination source of the high-illumination numerical aperture-based large field-of-view high-resolution microimaging device, sequentially lighting up each LED unit of the LED array, after illuminating the specimen to be examined, images in focus and images with defocus distance h are respectively collected, then calculating an illumination angle corresponding to each of the three channels of red, green and blue for each LED unit by using a sub-pixel registration algorithm, and then determining the position of the LED array by using nonlinear regression;

capturing raw images, by using the LED array as the illumination source of the large field-of-view high-resolution micro-imaging device, sequentially lighting up each LED unit of the LED array, and after illuminating the specimen to be examined, collecting corresponding low-resolution raw images;

pre-processing raw images, including threshold denoising and brightness correction, by firstly using an average value of a dark current noise of the camera as a threshold, performing threshold denoising on the captured low-resolution raw images, obtaining denoised low-resolution images, and then dividing each denoised low-resolution image by the normalized brightness correction coefficient obtained in the step of calibrating the brightness of the LED unit, thereby obtaining brightness-corrected low-resolution images;

initializing high-resolution images, by adding and averaging all the low-resolution bright-field images among the brightness-corrected low-resolution images, and then initializing amplitude and phase of high-resolution images by up-sampling; and performing an iterative reconstruction, wherein all the brightness corrected low-resolution images are subjected to synthetic aperture calculation one by one in a frequency domain using a pixel binning based Fourier ptychographic iterative reconstruction method while gradually reducing an updating coefficient, a cost function value is used as a criterion, and when the cost function value is less than a given threshold, the iteration is stopped, and the amplitude and phase of the high-resolution image are determined to be a final reconstructed large field-of-view high-resolution microscopic image.

2. The method according to claim 1, wherein the microscope objective has a numerical aperture of $NA_{obj}$ and satisfies $$NA_{obj}\frac{f}{d} > 1,$$

wherein f is a focal length of the condenser, d is a spacing between adjacent LED units, d<2 mm, and wherein an illumination wavelength of the LED array is $\lambda$, a magnification of the microscope objective is Mag, a pixel size is $\Delta x_{cam}$, and the illumination wavelength satisfies $$\lambda \frac{Mag}{2\Delta x_{cam}} \frac{f}{d} > 1.$$

3. The method according to claim 1, wherein the camera is a color or monochrome camera, and when the camera is a monochrome camera, when imaging, each LED unit of the LED array emits red or green or blue monochromatic light respectively, recording all monochrome images sequentially by the monochrome camera; when the camera is a color camera, when imaging, each of the LED units of the LED array simultaneously emits red, green and blue light, recording all color images by the color camera.

4. The method according to claim 1, further comprising a microscope oil disposed between the condenser and the specimen to be examined.

5. The method according to claim 1, wherein in the step of calibrating the brightness of the LED unit, the entire LED array comprises a total of N LED units, N>261, each LED unit emits monochromatic light of red, green and blue, respectively, a total of 3N low-resolution images are captured, and the image of the blank specimen lighted by the i-th LED unit with color c is captured and marked as $I_{i,c}^{kb}(r)$, where i=1,2, . . . ,N, c=r,g,b, r is two-dimensional coordinates of real space r=(x,y), and then an average intensity of each image is calculated as $$B_{i,c}^{kb} = \frac{1}{N_{pixel}} \sum_r I_{i,c}^{kb}(r)$$

and becomes the average brightness of each LED unit in three channels of red, green and blue, where $N_{pixel}$ is a total number of pixels in one image $I_{i,c}^{kb}(r)$, an average brightness corresponding to the LED unit in a center of the LED array is $B_{I,c}^{kb}$, and then the normalized brightness correction coefficient $R_{i,c}^{bri}$ of each LED unit corresponding to three channels of red, green and blue is $R_{i,c}^{bri}=B_{i,c}^{kb}/B_{I,c}^{kb}$.

6. The device according to claim 1, wherein the step of calibrating the position of the LED array further comprises the steps of:

after the LED array illuminating the specimen to be examined, first respectively collecting in-focus image $I_{i,c}^{focus}$ and defocus image $I_{i,c}^{defocus}$ with defocus distance h;

according to angular spectrum diffraction theory, numerically propagating in-focus image $I_{I,c}^{focus}$ corresponding to the LED unit in a center of LED array along optical axis with numerical value h distance, thereby obtaining numerical defocus image $I_{I,c}^{pro}$;

calculating an offset value $(PY_x,PY_y)$ of each defocus image $I_{i,c}^{defocus}$ relative to the numerical defocus image $I_{I,c}^{pro}$ by using sub-pixel registration algorithm, wherein a spatial frequency vector of illumination light corresponding to the i-th LED unit is $$u_i = (u_x, u_y) = \frac{2\pi}{\lambda}\left(\frac{PY_x}{\sqrt{PY_x^2 + PY_y^2 + h^2}}, \frac{PY_y}{\sqrt{PY_x^2 + PY_y^2 + h^2}}\right),$$

where $(u_x,u_y)$ is a spatial frequency along the x,y direction, and $\lambda$ is a wavelength of the illumination light; and finally determining the position of the LED array by nonlinear regression according to formulas of:

$$Q(u_i, \theta^0, \Delta x^0, \Delta y^0, f^0) = \sum_i |u_i - u_i^0|^2,$$

-continued $$(\theta, \Delta x, \Delta y, f) = \mathcal{NL}[Q(u_i, \theta^0, \Delta x^0, \Delta y^0, f^0)],$$
$$x_i = d[\cos(\theta)m_i + \sin(\theta)n_i] + \Delta x$$
$$y_i = d[-\sin(\theta)m_i + \cos(\theta)n_i] + \Delta y,$$
$$u_i = \frac{2\pi}{\lambda} \frac{x_i}{f}$$
$$v_i = \frac{2\pi}{\lambda} \frac{y_i}{f},$$

where Q ( . . . ) is an objective function of a nonlinear regression method, (θ, Δx, Δy, f) are updated four position parameters of the LED array, which are respectively a rotation error, a translation error in the x direction, a translation error in the y direction, and a focusing error, ($\theta^0$, $\Delta x^0$, $\Delta y^0$, $f^0$) are initialized LED array position parameters, $\mathcal{NL}$ indicates that a nonlinear regression operation is performed, d is a spacing between two adjacent LED units of the LED array, ($x_i, y_i$) represents spatial position coordinates of the i-th LED unit, λ is a wavelength of the illumination light, and ($m_i, n_i$) is a row number and a column number corresponding to the i-th LED unit.

7. The method according to claim 1, wherein the step of pre-processing raw images further comprises the steps of:
   first sequentially lighting up the LED units and illuminating the specimen to be examined by using monochromatic light of red, green and blue, wherein the captured original low-resolution images are marked as $I_{i,c}$;
   turning off all the LED units and the captured dark current noise image $I_{dark}$;
   using the average value of the dark current noise of the camera as a threshold, and then performing threshold denoising on the captured original low-resolution images according to the formula of $$I_{i,c}^{dn}(r) = \begin{cases} I_{i,c}(r) - \text{mean}(I_{dark}), & I_{i,c}(r) > \text{mean}(I_{dark}) \\ 0, & I_{i,c}(r) <= \text{mean}(I_{dark}) \end{cases},$$

where $I_{i,c}^{dn}$ represents low-resolution images after the threshold denoising, and mean ( . . . ) indicates evaluating average gray value of the image; and
   then dividing each image by the normalized brightness correction coefficient obtained in the step of calibrating the brightness of the LED unit to accomplish an image brightness correction process according to the formula of:

$$I_{i,c}^{uni} = I_{i,c}^{dn}/R_{i,c}^{bri},$$

where $I_{i,c}^{uni}$ is a low-resolution image after brightness correction, $I_{i,c}^{dn}$ is a low-resolution image after performing threshold denoising, $R_{i,c}^{bri}$ is a normalized brightness correction coefficient obtained in the step of calibrating the brightness of the LED unit.

8. The method according to claim 1, wherein in the step of performing the iterative reconstruction, formula based on the pixel binning based Fourier ptychographic iterative method is as follows:

$$O_i^k = F\{o_i^k\},$$

$$\Psi_i^k = F\left\{UP\left[\sqrt{\frac{I_{i,c}^{uni}}{\text{DOWN}[|F^{-1}\{P_i^k O_i^k\}|^2]}}\right] F^{-1}\{P_i^k O_i^k\}\right\},$$

$$O_{i+1}^k = O_i^k - \alpha^k \frac{|P_i^k|}{|P_i^k|_{max}(|P_i^k|^2 + \gamma)} P_i^{k*}(\Psi_i^k - P_i^k O_i^k),$$

$$P_{i+1}^k = P_i^k - \beta^k \frac{|O_i^k|}{|O_i^k|_{max}(|O_i^k|^2 + \gamma)} O_i^{k*}(\Psi_i^k - P_i^k O_i^k),$$

$$\alpha^k = \frac{\alpha^1}{k}, \alpha^1 = \frac{1}{2},$$

$$\beta^k = \frac{\beta^1}{k}, \beta^1 = \frac{1}{N}, \text{ and}$$

$$COST^k = \sum_i \text{abs}(I_{i,c}^{uni} - \text{DOWN}[|F^{-1}\{P_i^k O_i^k\}|^2]),$$

where F { . . . } indicates that a Fourier transform is performed, $F^{-1}$ { . . . } indicates that an inverse Fourier transform is performed, UP[ . . . ] indicates that the up-sampling nearest-neighbor interpolation is performed, DOWN[ . . . ] indicates a down-sampling pixel binning process; $O_i^k$ is a high-resolution spectrum of the specimen to be examined, k represents the k-th iteration, $P_i^k$ is the spectrum aperture function of the microscopic objective, and $\Psi_i^k$ is an updated local spectrum of the specimen to be examined, γ is a constant to ensure that a denominator is not zero, and a typical value is 0.001; | . . . | represents a modulus of a two-dimensional complex matrix, $|\ldots|_{max}$ represents a maximum value in the modulus of the two-dimensional complex matrix; $\alpha^k$ is an updated coefficient of the spectrum of the specimen to be examined in the k-th iteration, $\beta^k$ is an updated coefficient of an aperture function of the microscopic objective in the k-th iteration, $COST^k$ is the cost function, and
   wherein when the cost function $COST^k$ is less than a certain fixed threshold ε at an end of the k-th iteration, the iteration is considered to be convergent and the iteration is stopped, the amplitude and the phase of the high-resolution image at the moment are determined to be the finally reconstructed large field-of-view high-resolution microscopic image.

9. A high-illumination numerical aperture-based large field-of-view high-resolution microimaging iterative reconstruction method by using a high-illumination numerical aperture-based large field-of-view high-resolution microimaging device comprising:
   an LED array;
   a stage;
   a condenser;
   a microscopic objective;
   a tube lens; and
   a camera,
   wherein the LED array is arranged on a forward focal plane of the condenser, and a center of the LED array is on an optical axis of the microscope objective,
   wherein a back focal plane of the microscope objective coincides with a forward focal plane of the tube lens, an imaging plane of the camera is placed on a back focal plane of the tube lens, and during imaging, a specimen to be examined on the stage is adjusted to a front focal plane position of the microscope objective to form an infinity-corrected imaging system, and
   wherein light emitted by an i-th lit LED unit of the LED array passes through the condenser and converges to become parallel light illuminating the specimen to be examined, which is placed on the stage, and part of diffracted light passing through the specimen is collected by the microscopic objective, converged by the tube lens, and reaches the imaging plane of the camera, forming an intensity image recorded by the camera, said method comprising the steps of:

calibrating a brightness of the LED unit, by using the LED array as an illumination source of the high-illumination numerical aperture-based large field-of-view high-resolution microimaging device, sequentially lighting up each LED unit of the LED array, and after illuminating a blank specimen, using high magnification objective lens to collect corresponding image and calculating a normalized brightness correction coefficient corresponding to each LED unit in three channels of red, green and blue;

calibrating a position of the LED array, by using a resolution board as the specimen to be examined, using the LED array as the illumination source of the high-illumination numerical aperture-based large field-of-view high-resolution microimaging device, sequentially lighting up each LED unit of the LED array, after illuminating the specimen to be examined, in-focus images and defocus images with defocus distance h are respectively collected, then calculating an illumination angle corresponding to each of the three channels of red, green and blue for each LED unit by using a sub-pixel registration algorithm, and then determining the position of the LED array by using nonlinear regression;

capturing raw images, by using the LED array as the illumination source of the high-illumination numerical aperture-based large field-of-view high-resolution micro-imaging device, sequentially lighting up each LED unit of the LED array, and after illuminating the specimen to be examined, collecting corresponding low-resolution raw images;

pre-processing raw images, including threshold denoising and brightness correction, by firstly using an average value of a dark current noise of the camera as a threshold, performing threshold denoising on the captured low-resolution raw images to obtain denoised low-resolution images, and then dividing each denoised low-resolution image by the normalized brightness correction coefficient obtained in the step of calibrating the brightness of the LED unit, thereby obtaining brightness-corrected low-resolution images;

initializing high-resolution images, by adding and averaging all the low-resolution bright-field images among the brightness-corrected low-resolution images, and then initializing amplitude and phase of the high-resolution images by up-sampling;

performing an iterative reconstruction, wherein each of the brightness corrected low-resolution images is subjected to synthetic aperture calculation one by one in a frequency domain by using a pixel binning based Fourier ptychographic recovery method and an updating coefficient is gradually reduced, a cost function value is used as a criterion, and when the cost function value is less than a given threshold, the iteration is stopped, and the amplitude and phase of the high-resolution images are determined to be a final reconstructed large field-of-view high-resolution microscopic images; and performing a color fusion by repeating the step of initializing the high-resolution images and the step of performing the iterative reconstruction, respectively reconstructing high-resolution images of red, green and blue channels, and then synthesizing three reconstructed high-resolution images as the red, green and blue channels respectively of a final true color image.

10. The method according to claim 9, wherein the microscope objective has a numerical aperture of $NA_{obj}$ and satisfies $$NA_{obj}\frac{f}{d} > 1,$$

wherein f is a focal length of the condenser, d is a spacing between adjacent LED units, d<2 mm, and wherein an illumination wavelength of the LED array is λ, a magnification of the microscope objective is Mag, a pixel size is $\Delta x_{cam}$, and the illumination wavelength satisfies $$\lambda \frac{Mag f}{2\Delta x_{cam} d} > 1.$$

11. The method according to claim 9, wherein the camera is a color or monochrome camera, and when the camera is a monochrome camera, when imaging, each LED unit of the LED array emits red or green or blue monochromatic light respectively, recording all monochrome images sequentially by the monochrome camera; when the camera is a color camera, when imaging, each of the LED units of the LED array simultaneously emits red, green and blue light, recording all color images by the color camera.

12. The method according to claim 9, further comprising a microscope oil disposed between the condenser and the specimen to be examined.

13. The method according to claim 9, wherein in the step of calibrating the brightness of the LED unit, the entire LED array comprises a total of N LED units, N>261, each LED unit emits monochromatic light of red, green and blue, respectively, a total of 3N low-resolution images are captured, and the image of the blank specimen lighted by the i-th LED unit with color c is captured and marked as $I_{i,c}^{kb}(r)$, where i=1,2,...,N c=r,g,b, r is two-dimensional coordinates of real space r=(x,y), and then an average intensity of each image is calculated as $$B_{i,c}^{kb} = \frac{1}{N_{pixel}} \sum_r I_{i,c}^{kb}(r)$$

and becomes the average brightness of each LED unit in three channels of red, green and blue, where $N_{pixel}$ is a total number of pixels in one image $I_{i,c}^{kb}(r)$, an average brightness corresponding to the LED unit in a center of the LED array is $B_{l,c}^{kb}$, and then the normalized brightness correction coefficient $R_{i,c}^{bri}$ of each LED unit corresponding to three channels of red, green and blue is $R_{i,c}^{bri}=B_{i,c}^{kb}/B_{l,c}^{kb}$.

14. The device according to claim 9, wherein the step of calibrating the position of the LED array further comprises the steps of:

after the LED array illuminating the specimen to be examined, first respectively collecting in-focus image $I_{i,c}^{focus}$ and defocus image $I_{i,c}^{defocus}$ with defocus distance h;

according to angular spectrum diffraction theory, numerically propagating in-focus image $I_{i,c}^{focus}$ corresponding to the LED unit in a center of LED array along optical axis with numerical value h distance, thereby obtaining numerical defocus image $I_{i,c}^{pro}$;

calculating an offset value $(PY_x, PY_y)$ of each defocus image $I_{i,c}^{defocus}$ relative to the numerical defocus image $I_{i,c}^{pro}$ by using sub-pixel registration algorithm, wherein a spatial frequency vector of illumination light corresponding to the i-th LED unit is $$u_i = (u_x, u_y) = \frac{2\pi}{\lambda} \left( \frac{PY_x}{\sqrt{PY_x^2 + PY_y^2 + h^2}}, \frac{PY_y}{\sqrt{PY_x^2 + PY_y^2 + h^2}} \right),$$

where $(u_x, u_y)$ is a spatial frequency along the x,y direction, and $\lambda$ is a wavelength of the illumination light; and finally determining the position of the LED array by nonlinear regression according to formulas of:

$$Q(u_i, \theta^0, \Delta x^0, \Delta y^0, f^0) = \sum_i |u_i - u_i^0|^2,$$

$$(\theta, \Delta x, \Delta y, f) = \mathcal{NL}[Q(u_i, \theta^0, \Delta x^0, \Delta y^0, f^0)],$$

$$x_i = d[\cos(\theta)m_i + \sin(\theta)n_i] + \Delta x$$

$$y_i = d[-\sin(\theta)m_i + \cos(\theta)n_i] + \Delta y'$$

$$u_i = \frac{2\pi}{\lambda} \frac{x_i}{f}$$

$$v_i = \frac{2\pi}{\lambda} \frac{y_i}{f},$$

where $Q(\ldots)$ is an objective function of a nonlinear regression method, $(\theta, \Delta x, \Delta y, f)$ are updated four position parameters of the LED array, which are respectively a rotation error, a translation error in the x direction, a translation error in the y direction, and a focusing error, $(\delta^0, \Delta x^0, \Delta y^0, f^0$ are initialized LED array position parameters, $\mathcal{NL}[\ldots]$ indicates that a nonlinear regression operation is performed, d is a spacing between two adjacent LED units of the LED array, $(x_i, y_i)$ represents spatial position coordinates of the i-th LED unit, $\lambda$ is a wavelength of the illumination light, and $(m_i, n_i)$ is a row number and a column number corresponding to the i-th LED unit.

15. The method according to claim 9, wherein the step of pre-processing raw images further comprises the steps of:

first sequentially lighting up the LED units and illuminating the specimen to be examined by using monochromatic light of red, green and blue, wherein the captured original low-resolution images are marked as $I_{i,c}$;

turning off all the LED units and the captured dark current noise image $I_{dark}$;

using the average value of the dark current noise of the camera as a threshold, and then performing threshold denoising on the captured original low-resolution images according to the formula of $$I_{i,c}^{dn}(r) = \begin{cases} I_{i,c}(r) - \text{mean}(I_{dark}), & I_{i,c}(r) > \text{mean}(I_{dark}) \\ 0, & I_{i,c}(r) <= \text{mean}(I_{dark}) \end{cases},$$

where $I_{i,c}^{dn}$ represents low-resolution images after the threshold denoising, and mean ( . . . ) indicates evaluating average gray value of the image; and then dividing each image by the normalized brightness correction coefficient obtained in the step of calibrating the brightness of the LED unit to accomplish an image brightness correction process according to the formula of:

$$I_{i,c}^{uni} = I_{i,c}^{dn} / R_{i,c}^{bri}$$

where $I_{i,c}^{uni}$ is a low-resolution image after brightness correction, $I_{i,c}^{dn}$ is a low-resolution image after performing threshold denoising, $R_{i,c}^{bri}$ is a normalized brightness correction coefficient obtained in the step of calibrating the brightness of the LED unit.

16. The method according to claim 9, wherein in the step of performing the iterative reconstruction, formula based on the pixel binning based Fourier ptychographic iterative method is as follows:

$$O_i^k = F\{o_i^k\},$$

$$\Psi_i^k = F\left\{\text{UP}\left[\sqrt{\frac{I_{i,c}^{uni}}{\text{DOWN}[|F^{-1}\{P_i^k O_i^k\}|^2]}}\right] F^{-1}\{P_i^k O_i^k\}\right\},$$

$$O_{i+1}^k = O_i^k - \alpha^k \frac{|P_i^k|}{|P_i^k|_{max}(|P_i^k|^2 + \gamma)} P_i^{k*}(\Psi_i^k - P_i^k O_i^k),$$

$$P_{i+1}^k = P_i^k - \beta^k \frac{|O_i^k|}{|O_i^k|_{max}(|O_i^k|^2 + \gamma)} O_i^{k*}(\Psi_i^k - P_i^k O_i^k),$$

$$\alpha^k = \frac{\alpha^1}{k}, \alpha^1 = \frac{1}{2},$$

$$\beta^k = \frac{\beta^1}{k}, \beta^1 = \frac{1}{N}, \text{ and}$$

$$\text{COST}^k = \sum_i \text{abs}(I_{i,c}^{uni} - \text{DOWN}[|F^{-1}\{P_i^k O_i^k\}|^2]),$$

where $F\{\ldots\}$ indicates that a Fourier transform is performed, $F^{-1}\{\ldots\}$ indicates that an inverse Fourier transform is performed, UP[ . . . ] indicates that the up-sampling nearest-neighbor interpolation is performed, DOWN[ . . . ] indicates a down-sampling pixel binning process; $O_i^k$ is a high-resolution spectrum of the specimen to be examined, k represents the k-th iteration, $P_i^k$ is the spectrum aperture function of the microscopic objective, and $\Psi_i^k$ is an updated local spectrum of the specimen to be examined, $\gamma$ is a constant to ensure that a denominator is not zero, and a typical value is 0.001; | . . . | represents a modulus of a two-dimensional complex matrix, | . . . |$_{max}$ represents a maximum value in the modulus of the two-dimensional complex matrix; $\alpha^k$ is an updated coefficient of the spectrum of the specimen to be examined in the k-th iteration, $\beta^k$ is an updated coefficient of an aperture function of the microscopic objective in the k-th iteration, COST$^k$ is the cost function, and wherein when the cost function COST$^k$ is less than a certain fixed threshold $\varepsilon$ at an end of the k-th iteration, the iteration is considered to be convergent and the iteration is stopped, the amplitude and the phase of the high-resolution image at the moment are determined to be the finally reconstructed large field-of-view high-resolution microscopic image.

\* \* \* \* \*